(12) United States Patent
Butterworth et al.

(10) Patent No.: US 11,498,174 B1
(45) Date of Patent: Nov. 15, 2022

(54) WELDER GUARD SYSTEM

(71) Applicant: Southwire Company, LLC, Carrollton, GA (US)

(72) Inventors: Cyrus Scott Butterworth, Heflin, AL (US); Nathan Russell George, Carrollton, GA (US)

(73) Assignee: Southwire Company, LLC, Carrollton, GA (US)

( * ) Notice: Subject to any disclaimer, the term of this patent is extended or adjusted under 35 U.S.C. 154(b) by 855 days.

(21) Appl. No.: 16/274,512

(22) Filed: Feb. 13, 2019

(51) Int. Cl.
  *B23Q 11/00* (2006.01)
  *B23K 37/00* (2006.01)
  *B23K 37/04* (2006.01)

(52) U.S. Cl.
  CPC ........ *B23Q 11/0089* (2013.01); *B23K 37/006* (2013.01); *B23Q 11/0085* (2013.01); *B23K 37/0435* (2013.01)

(58) Field of Classification Search
  CPC ...... H01H 3/16; H01H 3/161; B23Q 11/0089; B23Q 11/0085; B23K 37/006; B23K 37/0435; B23K 9/321; B23K 11/25
  USPC .......... 219/121.63; 200/61.58 R, 61.62, 334; 361/1
  See application file for complete search history.

(56) References Cited

U.S. PATENT DOCUMENTS

| | | | |
|---|---|---|---|
| 5,257,431 A | * 11/1993 | Larson | ..................... B64F 1/305 14/71.5 |
| 10,232,459 B2 | * 3/2019 | Hoffman | ................. B23K 9/325 |
| 2009/0219013 A1 | * 9/2009 | Hechinger | ........... H03K 17/972 324/207.15 |
| 2018/0113434 A1 | * 4/2018 | Shapiro | ................ B23K 37/006 |

OTHER PUBLICATIONS

Micro Products Company, AD Series Butt Welders for Aluminum, Copper and Brass, retrieved at http://electric-resistance-welders.micro-weld.com/viewitems/non-ferrous-butt-welders/-series-butt-welders-for-aluminum-copper-and-brass? on Feb. 13, 2019.

* cited by examiner

*Primary Examiner* — Dana Ross
*Assistant Examiner* — James F Sims, III
(74) *Attorney, Agent, or Firm* — Hartman & Citrin LLC

(57) ABSTRACT

A welder guard system is disclosed. According to various embodiments of the concepts and technologies described herein, the welder guard system can include a base and a lid attached to the base. The welder guard system can also include a safety switch system having an actuating device and a sensing device. The actuating device can be attached to the lid of the welder guard system and can provide a wireless signal. The sensing device can cause a welding device to prevent a welding jaw of the welding device from closing in response to activation of a clamping operation of the welding device when the sensing device fails to receive the wireless signal provided by the actuating device.

18 Claims, 4 Drawing Sheets

WELDER GUARD SYSTEM

BACKGROUND

Pieces of a linear element, such as a wire, a cable, and a conductor, can be joined together through a welding process performed by a welding device. Such a welding device can include welding jaws that receive, align, and hold the pieces of the linear element as the pieces are undergoing the welding process performed by the welding device. When the welding jaws are in an open position, an operator can place the pieces of the linear element within the welding jaws. A clamping operation can then be initiated to place the welding jaws in a closed position to clamp down on the respective pieces of the linear element to align and hold the pieces of the linear element during the welding process. However, as an operator is placing the pieces of the linear element in the respective open welding jaws, the clamping operation can be accidentally initiated causing one or more of the welding jaws to close on the operator's fingers and/or hands resulting in serious injury to the operator.

SUMMARY

The present disclosure is directed to a welder guard system. According to various embodiments of the concepts and technologies described herein, the welder guard system can include a base and a lid attached to the base. The welder guard system can also include a safety switch system having an actuating device and a sensing device. The actuating device can be attached to the lid of the welder guard system and can provide a wireless signal. The sensing device can cause a welding device to prevent a welding jaw of the welding device from closing in response to activation of a clamping operation of the welding device when the sensing device fails to receive the wireless signal provided by the actuating device.

In some embodiments, the welder guard system can include a base, a lid attached to the base, and a safety switch system. The safety switch system can include an actuating device attached to the lid and a sensing device. The sensing device can be positioned such that the actuating device is within a sensing range of the sensing device when the lid is in a closed position and is outside of the sensing range of the sensing device when the lid is moved to an open position. The sensing device can cause a welding device to prevent a welding jaw of the welding device from closing in response to activation of a clamping operation of the welding device when the lid is moved to the open position.

This Summary is provided to introduce a selection of concepts in a simplified form that are further described below in the Detailed Description. This Summary is not intended to be used to limit the scope of the claimed subject matter. Furthermore, the claimed subject matter is not limited to implementations that solve any or all disadvantages noted in any part of this disclosure.

DESCRIPTION OF THE DRAWINGS

The accompanying drawings, which are incorporated in and constitute a part of this disclosure, illustrate various embodiments of the present disclosure. In the drawings.

DETAILED DESCRIPTION

The following detailed description is directed to a welder guard system. More particularly, the detailed description is directed to a welder guard system that selectively controls the closing of one or more welding jaws of a welding device. Although the systems are sometimes described in the aforementioned context in terms of controlling the welding jaws in association with pieces of wire, it should be understood that the systems described herein may additionally or alternatively be used in other contexts to control the welding jaws in association with other types of linear elements, such as piping and tubing, that may be put through a welding process. As such, the particular implementations described herein should not be construed as being limiting in any way. This description provides various components, one or more of which may be included in particular implementations of the systems disclosed herein. In illustrating and describing these various components, however, it is noted that implementations of the embodiments disclosed herein may include any combination of these components, including combinations other than those shown in this description.

Figure 1A:
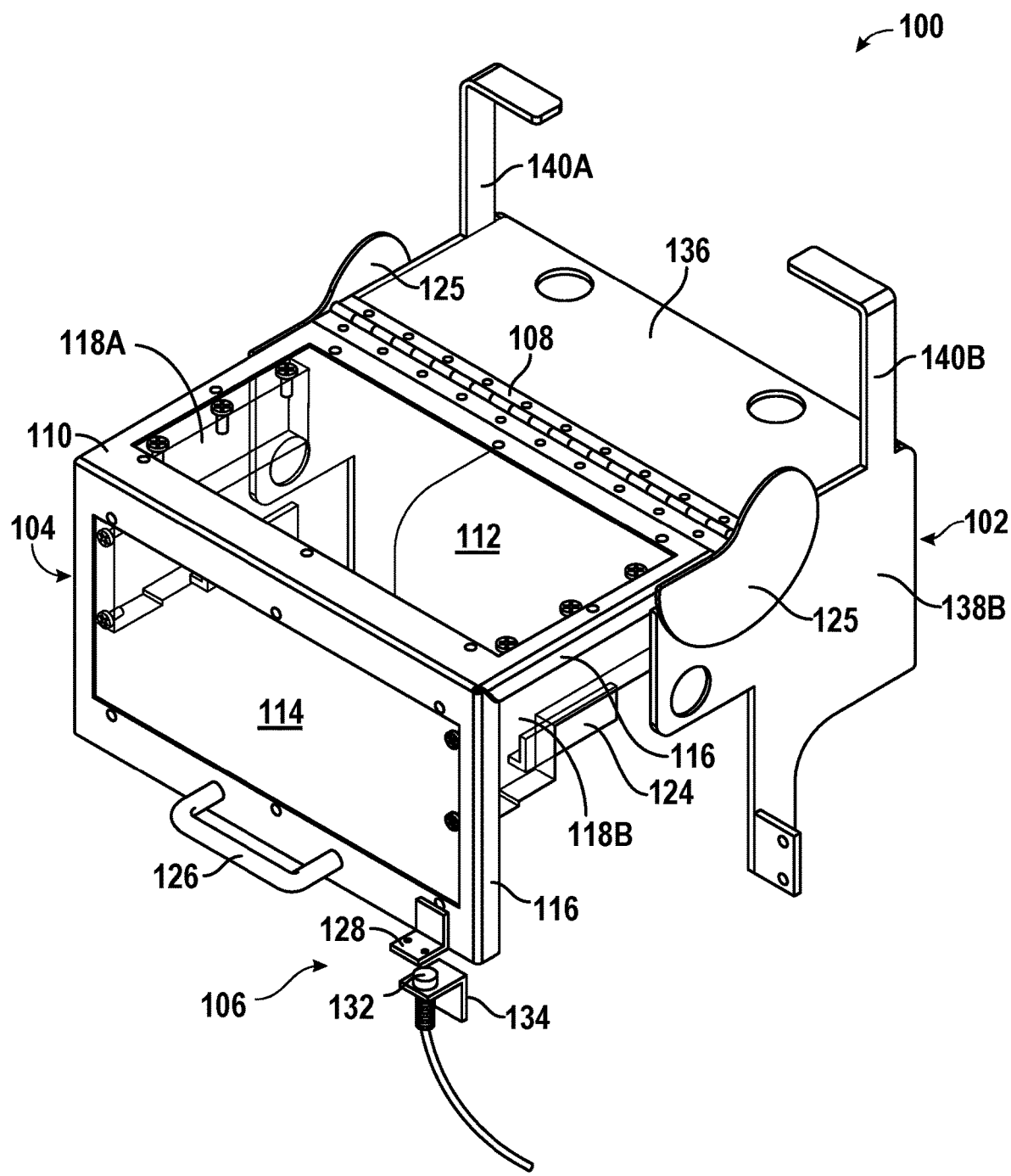
FIG. 1A illustrates a perspective view of a welder guard system in a closed position, according to illustrative embodiments.
Figure 2:
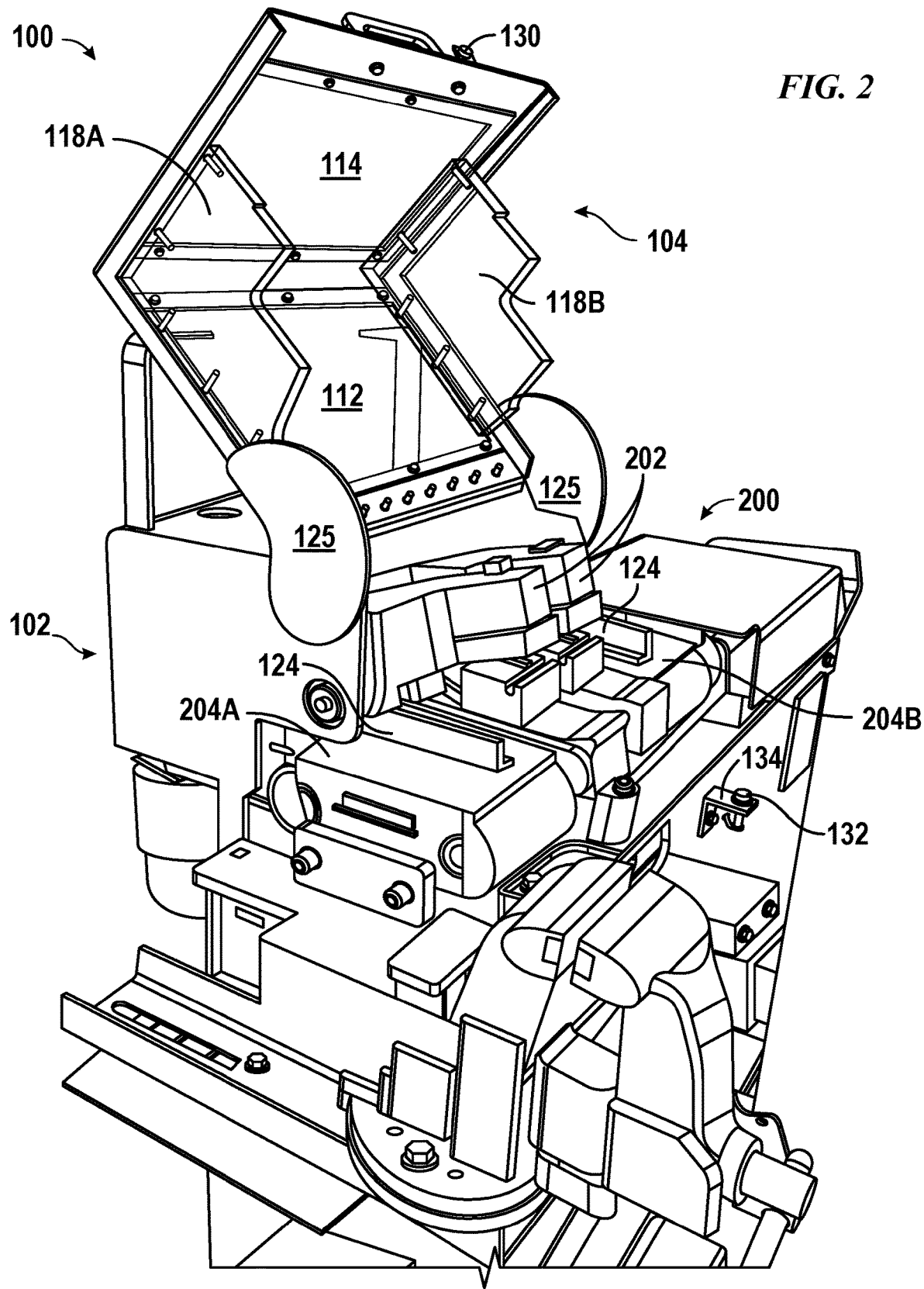
FIG. 2 illustrates a perspective view of the welder guard system in an open position installed on a welding device, according to illustrative embodiments.

FIG. 1A illustrates a welder guard system 100 in accordance with an illustrative embodiment. According to embodiments, the welder guard system 100 includes a base 102, a lid 104, and a safety switch system 106. Turning briefly to FIG. 2, the welder guard system 100 is installable on a welding device 200, according to an illustrative embodiment. The welder guard system 100 can protect an operator of the welding device 200 while the operator is loading pieces of wire into one or more welding jaws 202 of the welding device 200 and/or otherwise working around the welding jaws 202, as will be discussed further below. The welder guard system 100 can also protect an operator while the welding device 200 is performing a welding process on the pieces of wire, as will also be discussed further below.

Referring back to FIG. 1A, the lid 104 of the welder guard system 100 may be rotatably attached to the base 102 of the welder guard system 100 by a hinge 108. Although the hinge 108 illustrated in FIG. 1A is a single hinge, a plurality of hinges may be used to rotatably attach the lid 104 to the base 102. The lid 104 of the welder guard system 100 may be rotated, via the hinge 108, with respect to the base 102 to raise the lid 104 from a closed position illustrated in FIG. 1A to an open position illustrated in FIG. 1B. As will be discussed further below, rotating the lid 104 of the welder guard system 100 from the closed position to the open position causes the welding jaws 202 of the welding device 200 to open and/or to remain open regardless of whether a clamping operation to close the welding jaws 202 is initiated or is being initiated via, for example, one or more foot valve pedals (not shown) of the welding device 200. The lid 104 of the welder guard system 100 can also be rotated, via the hinge 108, with respect to the base 102 to lower the lid 104 from the open position illustrated in FIG. 1B to the closed position illustrated in FIG. 1A to allow the welding jaws 202 to close when the clamping operation is initiated. When the lid 104 is placed in the closed position allowing the welding jaws 202 to close when the clamping operation is initiated, the lid 104 can protect an operator from accidentally getting one or more fingers and/or hands crushed by the welding jaws 202 when the welding jaws 202 close and also can protect an operator from any hot slag, sparks, and/or flying debris that may be generated during the welding process when initiated.

According to embodiments, the lid 104 of the welder guard system 100 includes a frame 110 having a top portion housing a top panel 112 and a front portion housing a front panel 114. According to embodiments, the front portion of the frame 110 is arranged approximately ninety degrees from the top portion of the frame 110, causing the frame 110 to have an L-shaped configuration. The frame 110 can be constructed from a rolled metal, such as rolled steel, a temperature-resistant plastic, or any other material capable of withstanding temperatures experienced during the welding process of the welding device 200. The frame 110 can be constructed from a single piece of material bent to form the top portion and the front portion of the frame 110. Alternatively, the top portion of the frame 110 can be formed from one piece of material and the front portion of the frame 110 can be formed from another piece of the material that is joined to the top portion by, for example, welding the pieces of the material together and/or attaching the pieces of material together with a fastening device such as screws and/or bolts. Each side of the top portion of the frame 110 and each side of the bottom portion of the frame 110 can be bent inward to create a lip 116. The lip 116 can be used to help align and support the top panel 112 and the front panel 114.

The top panel 112 housed by the top portion of the frame 110 and the front panel 114 housed by the front portion of the frame 110 can be constructed of a transparent plastic, such as polycarbonate or acrylic, that is heat resistant and durable. The transparency of the top panel 112 and the front panel 114 allows an operator to observe the welding jaws 202 and the welding process when the lid 104 is in the closed position illustrated in FIG. 1A while remaining protected by the closed lid 104 from any hot slag, sparks, or flying debris that may be generated during the welding process. Although the top and front panels 112, 114 are illustrated and discussed as being transparent, the top and front panels 112, 114 can instead be constructed of an opaque material or a combination of both transparent and opaque materials. The top panel 112 can be attached to the top portion of the frame 110 by screws, bolts, glue, or any other type of fastening device that can secure the top panel 112 to the frame 110. Similarly, the front panel 114 can be attached to the front portion of the frame 110 by screws, bolts, glue, or any other type of fastening device that can secure the front panel 114 to the frame 110.

Figure 1B:
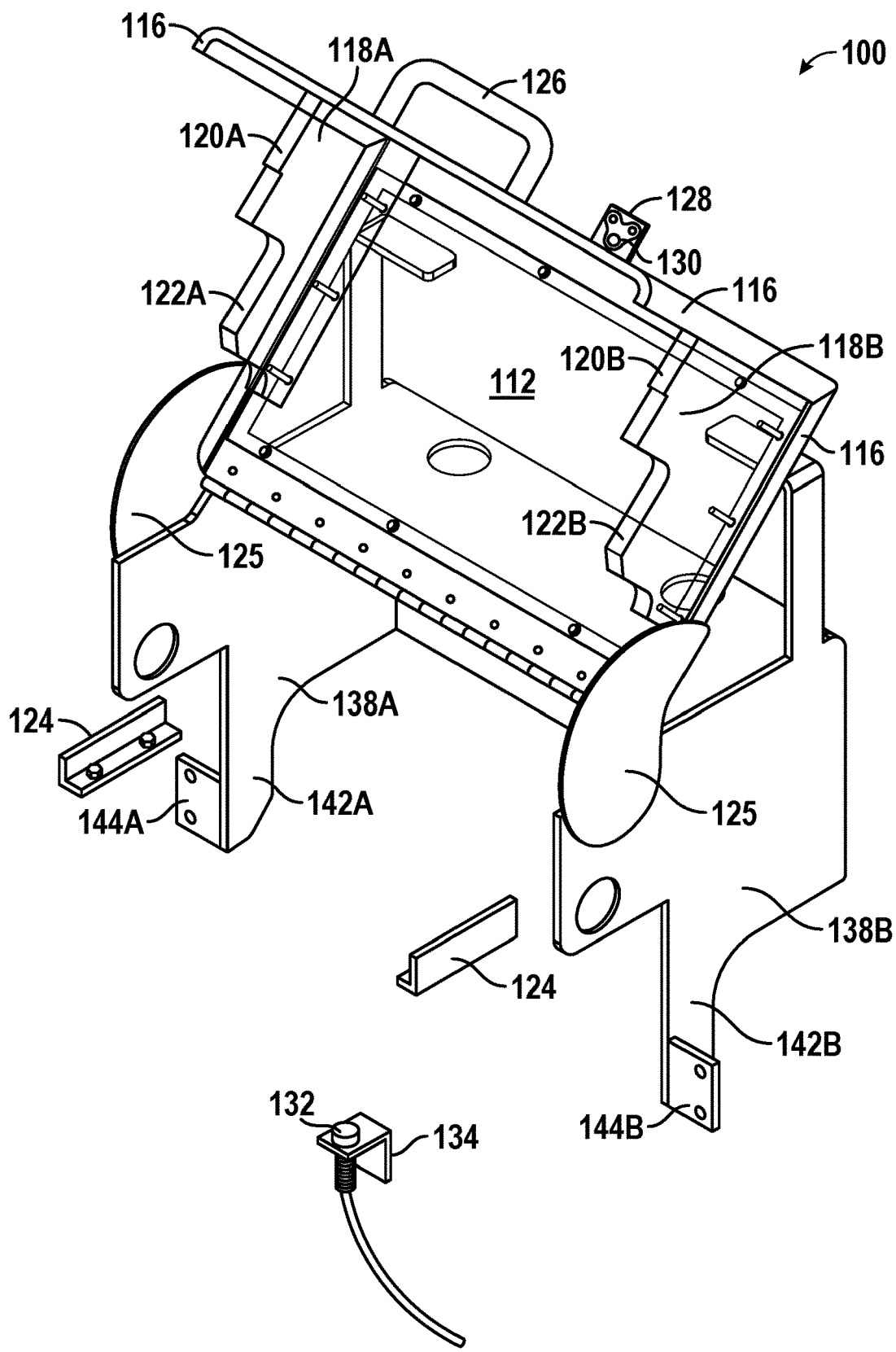
FIG. 1B illustrates a perspective view of the welder guard system in an open position, according to illustrative embodiments.

According to embodiments, the lid 104 also includes side panels 118A, 118B. As best shown in FIGS. 1B and 2, the side panels 118A, 118B can be positioned on opposing sides of the lid 104. The side panels 118A, 118B can extend from a corner formed by the top and front portions of the frame 110 along at least a portion of the top portion of the frame 110 and along at least a portion of the front portion of the frame 110. The side panels 118A, 118B may be shaped such that when the lid 104 is in the closed position, at least a portion of an edge 120A of the side panel 118A aligns with a portion of the profile of a welding platform 204A of the welding device 200 and at least a portion of an edge 120B of the side panel 118B aligns with a portion of the profile of a welding platform 204B of the welding device 200 supporting the welding jaws 202. According to embodiments, the side panels 118A, 118B obstruct an object, such as a finger and/or hand of an operator, from reaching under the lid 104 and contacting the welding jaws 202 when the lid 104 is in the closed position. The side panel 118A can have a generally L-shaped configuration having the edge 120A that aligns with a portion of the profile of the welding platform 204A of the welding device 200 and that is proximate the welding platform 204A when the lid 104 is placed in the closed position. The side panel 118A also includes an edge 122A that is spaced apart from the welding platform 204A when the lid 104 is placed in the closed position to allow clearance for a wire loaded in the welding device 200 to pass therethrough. Similarly, the side panel 118B can have a generally L-shaped configuration having the edge 120B that aligns with a portion of the profile of the welding platform 204B of the welding device 200 and that is proximate to the welding platform 204B when the lid 104 is placed in the closed position. The side panel 118B also includes an edge 122B that is spaced apart from the welding platform 204B when the lid 104 is placed in the closed position to allow clearance for a wire loaded in the welding device 200 to pass therethrough. When the lid 104 is placed in the closed position, the lid 104 can sufficiently enclose the welding jaws 202 of the welding device 200 to prevent an operator from touching the welding jaws 202 and also to protect an operator from any sparks, hot slag, and/or flying debris generated during the welding process. Although the side panels 118A, 118B are described and illustrated herein as having a generally L-shaped configuration, one skilled in the art should understand that the side panels 118A, 118B can take on different configurations based on the profile and/or construction of a welding device, such as the welding device 200, on which the welder guard system 100 is installed.

Like the top panel 112 and the front panel 114, the side panels 118A, 118B can be constructed of a transparent plastic, such as polycarbonate or acrylic, that is heat resistant and durable. Although the side panels 118A, 118B are illustrated and discussed as being transparent, the side panels 118A, 118B can instead be constructed of an opaque material or a combination of both transparent and opaque materials. According to embodiments, the side panel 118A is positioned within the frame 110 proximate the inside of the lip 116 on one side of the frame 110, and the side panel 118B is positioned within the frame 110 proximate the inside of the lip 116 on the opposing side of the frame 110. The lip 116 of the frame 110 can be used to help align and support the side panels 118A, 118B. The side panel 118A can be attached to the top panel 112 and to the front panel 114 by screws, bolts, glue, or any other type of fastening device that can secure the side panel 118A to the top panel 112 and the front panel 114. Similarly, the side panel 118B can be attached to the top panel 112 and to the front panel 114 by screws, bolts, glue, or any other type of fastening device that can secure the side panel 118B to the top panel 112 and the front panel 114.

In addition to the side panels 118A, 118B, finger guards 124 can be attached to the welding platforms 204A, 204B, as illustrated in FIG. 2, to act as additional barriers to fingers and/or hands of an operator that may pass through the clearance between the edges 122A, 122B of the side panels 118A, 118B, respectively, and the welding platforms 204A, 204B, respectively, when the lid 104 is in the closed position, while still allowing enough clearance for pieces of wire loaded in the welding device 200 to pass therethrough. The finger guards 124 can be attached to the welding platforms 204A, 204B such that when the lid 104 is in the closed position, the finger guards 124 are positioned within the lid 104 proximate the edges 122A, 122B of the side panels 118A, 118B, respectively. As best illustrated in FIG. 1B, the finger guards 124 can have an L-shaped configuration, although additional configurations that reduce the clearance between the edges 122A, 122B of the side panels 118A, 118B, respectively, and the welding platforms 204A, 204B, respectively, when the lid 104 is in the closed position while still allowing enough clearance for pieces of wire loaded in the welding device 200 to pass therethrough are contemplated. The finger guards 124 can be attached to the welding platforms 204A, 204B by screws, bolts, glue, or any other type of fastening device that can secure the finger guards 124 to the welding platform 204A, 204B. The finger guards 124 can be made of metal, a durable plastic such as, for example, nylon or ultra-high-molecular-weight polyethylene, or any other material that can withstand the heat generated during the welding process of the welding device 200.

The lid 104 can also include a handle 126 for raising the lid 104 to the open position and for lowering the lid 104 to the closed position. As illustrated in FIG. 1A, the handle 126 can be attached to a bottom of the front portion of the frame 110. The lid 104 can additionally include pinch point guards 125. One of the pinch point guards 125 can be attached to a portion of the lip 116 on one side of the top portion of the frame 110 of the lid 104 that is proximate to an edge of the base 102 when the lid 104 is closed, and another of the pinch point guards 125 can be attached to a portion of the lip 116 on the opposing side of the top portion of the frame 110 that is proximate to an opposing edge of the base 102 when the lid 104 is closed. As the lid 104 is raised and lowered, the pinch point guards 125 move with the lid 104 and relative to the base 102. As illustrated in FIG. 1A, when the lid 104 is in the closed position, the pinch point guards 125 cover the pinch point created by the edges of the lip 116 where the pinch point guards 125 are attached and the edges of the base 102. According to embodiments, the pinch point guards 125 protect one or more body parts of an operator from being pinched between the edges of the lip 116 of the lid 104 and the edges of the base 102 as the lid 104 is being lowered to the closed position. The pinch point guards 125 can be fabricated out of metal, such as steel, or any other type of material that is durable and heat resistant to temperatures experienced during the welding process of the welding device 200.

As briefly discussed above, raising the lid 104 of the welder guard system 100 from the closed position to the open position via, for example, the handle 126 causes the welding jaws 202 of the welding device 200 to open and/or to remain open regardless of whether a clamping operation to close one or more of the welding jaws 202 is initiated or is being initiated via, for example, one or more foot valve pedals (not shown) of the welding device 200. According to embodiments, this control over the clamping operation of the welding jaws 202 of the welding device 200 is provided by the safety switch system 106 of the welder guard system 100. The safety switch system 106 can include an actuating device 130 and a sensing device 132. According to embodiments, the actuating device 130 and the sensing device 132 of the safety switch system 106 are not physically connected to one another. The actuating device 130 can be attached to a mounting bracket 128 that, according to embodiments, is attached to the bottom of the front portion of the frame 110 of the lid 104 and extends outward from the front portion of the frame 110, as illustrated in FIGS. 1A and 1B. The actuating device 130 can be attached to an underside of the mounting bracket 128 such that when the lid 104 is placed in the closed position illustrated in FIG. 1A, the actuating device 130 is brought within a sensing range of the sensing device 132 of the safety switch system 106, and when the lid 104 is moved to the open position illustrated in FIG. 1B, the actuating device 130 is moved outside of the sensing range of the sensing device 132. According to embodiments, the sensing device 132 can be positioned such that when the lid 104 is placed in the closed position, as illustrated in FIG. 1A, the actuating device 130 is caused to be brought within the sensing range of the sensing device 132, and when the lid 104 is placed in the open position, as illustrated in FIG. 1B, the actuating device is removed from the sensing range of the sensing device 132. According to embodiments, the sensing device 132 can be attached to a switch mount 134 connected to the welding device 200, as best illustrated in FIG. 2, such that when the lid 104 is placed in the closed position, as illustrated in FIG. 1A, the actuating device 130 is caused to be brought within the sensing range of the sensing device 132, and when the lid 104 is placed in the open position, as illustrated in FIG. 1B, the actuating device is removed from the sensing range of the sensing device 132.

According to some embodiments, the actuating device 130 of the safety switch system 106 includes a transmitter that transmits a wireless signal, and the sensing device 132 of the safety switch system 106 includes a receiver that can receive the wireless signal from the actuating device 130. The sensing device 132 can also include a transmitter. When the lid 104 of the welder guard system 100 is placed in the closed position, causing the actuating device 130 attached to the lid 104 to move within the sensing range of the sensing device 132, the receiver of the sensing device 132 receives the wireless signal provided by the transmitter of the actuating device 130 that is indicative of the presence of the actuating device 130 within the sensing range of the sensing device 132. The wireless signal from the actuating device 130 may also include various identification information or other information of interest regarding the actuating device 130 that can be used by the sensing device 132 to confirm the identity of the actuating device 130 transmitting the wireless signal. In response to receiving the wireless signal from the actuating device 130, the sensing device 132 can generate and send, via the transmitter of the sensing device 132, signals to one or more other devices. According to embodiments, in response to receiving the wireless signal from the actuating device 130, the sensing device 132 can send an activation signal to a control unit, such as a solenoid valve, of the welding device 200 that controls the supply of compressed air to the welding jaws 202 of the welding device 200. Based on the activation signal from the sensing device 132, the control unit can open, or cause to be opened, a port associated with a flow of compressed air to the welding jaws 202 of the welding device 200 to allow the compressed air to be supplied to the welding jaws 202 to close the welding jaws 202 when the clamping operation for closing the welding jaws 202 is activated via, for example, one or more foot valve pedals of the welding device 200.

Conversely, when the lid 104 is placed in the open position, as illustrated in FIGS. 1B and 2, the actuating device 130 attached to the lid 104 is caused to be removed from the sensing range of the sensing device 132. When the actuating device 130 is removed from the sensing range of the sensing device 132, the sensing device 132 no longer receives the wireless signal provided by the transmitter of the actuating device 130. According to embodiments, in response to failing to receive the wireless signal from the actuating device 130, the sensing device 132 can generate and send a deactivation signal to the control unit of the welding device 200. Based on the deactivation signal from the sensing device 132, the control unit can close, or cause to be closed, the port associated with the flow of compressed air to the welding jaws 202 to block the supply of compressed air from being provided to the welding jaws 202 and prevent the welding jaws 202 from closing, causing the welding jaws 202 to remain open while the lid 104 is in and/or being placed in the open position even if or when the clamping operation is activated via, for example, one or more foot valve pedals of the welding device 200. For example, when the lid 104 of the welder guard system 100 is in and/or being placed in the open position, the welding jaws 202 are prevented from closing even if an operator initiates a clamping operation to close the welding jaws 202. The welding jaws 202 are prevented from closing when the lid 104 is in and/or being placed in the open position because the sensing device 132 signals the control unit to close the port associated with the flow of compressed air to the welding jaws 202, or cause the port to be closed, in response to the sensing device 132 failing to receive the wireless signal provided by the actuating device 130, which is moved beyond the sensing range of the sensing device 132 when the lid 104 is placed in the open position. By restricting the welding jaws 202 from closing when the lid 104 of the welder guard system 100 is in and/or being placed in the open position regardless of the clamping operation to close the welding jaws 202 being initiated, the welder guard system 100 protects an operator from accidentally getting one or more fingers and/or hands crushed by a clamping action of the welding jaws 202, which are accessible to the operator when the lid 104 is in the open position.

According to other embodiments, the actuating device 130 and the sensing device 132 of the safety switch system 106 both include a respective receiver and a respective transmitter. The transmitter of the sensing device 132 can transmit a query signal that can be received by the receiver of the actuating device 130 when the actuating device 130 is within proximity of the sensing device 132, such as when the lid 104 is in the closed position causing the actuating device 130 attached to the lid 104 to be brought within proximity of the sensing device 132. In response to receiving the query signal, the transmitter of the actuating device 130 can send a response signal that can be received by the receiver of the sensing device 132 when the actuating device 130 is within proximity of the sensing device 132, such as when the lid 104 is in the closed position causing the actuating device 130 to be brought within proximity of the sensing device 132. When the receiver of the sensing device 132 receives the response signal from the actuating device 130, the sensing device 132 can send an activation signal to the control unit of the welding device 200. Based on the activation signal from the sensing device 132, the control unit can open, or cause to be opened, the port associated with the flow of compressed air to the welding jaws 202 of the welding device 200 to allow the compressed air to be supplied to the welding jaws 202 to close the welding jaws 202 when the clamping operation to close the welding jaws 202 is activated via, for example, one or more foot valve pedals of the welding device 200. Conversely, when the receiver of the sensing device 132 does not receive the response signal from the actuating device 130, such as when the lid 104 is in, or being placed in, the open position, the sensing device 132 can generate and send a deactivation signal to the control unit of the welding device 200. Based on the deactivation signal from the sensing device 132, the control unit can close, or cause to be closed, the port associated with the flow of compressed air to the welding jaws 202 to block the supply of compressed air from being provided to the welding jaws 202 and prevent the welding jaws 202 from closing, causing the welding jaws 202 to remain open while the lid 104 is in and/or being placed in the open position even if or when the clamping operation is activated via, for example, one or more foot valve pedals of the welding device 200.

According to other embodiments, the sensing device 132 of the safety switch system 106 is an inductive proximity sensor that produces an electromagnetic field used to sense when the actuating device 130, which can include a piece of conductive metal, enters the electronic field. In response to detecting that the actuating device 130 has entered the electromagnetic field produced by the sensing device 132, such as when the lid 104 is placed in the closed position as illustrated in FIG. 1A and the actuating device 130 is brought within proximity of the sensing device 132, the sensing device 132 can generate and send an activation signal to the control unit of the welding device 200 that controls the supply of compressed air to the welding jaws 202 of the welding device 200. Based on the activation signal from the sensing device 132, the control unit can open, or cause to be opened, the port associated with the flow of compressed air to the welding jaws 202 of the welding device 200 to allow the compressed air to be supplied to the welding jaws 202 to close the welding jaws 202 when the clamping operation for closing the welding jaws 202 is activated via, for example, one or more foot valve pedals of the welding device 200.

Conversely, when the lid 104 is placed in the open position, as illustrated in FIGS. 1B and 2, the actuating device 130 is caused to be removed from the magnetic field generated by the sensing device 132. When the actuating device 130 is removed from the magnetic field of the sensing device 132, the sensing device 132 can generate and send a deactivation signal to the control unit of the welding device 200. Based on the deactivation signal from the sensing device 132, the control unit can close, or cause to be closed, the port associated with the flow of compressed air to the welding jaws 202 to block the supply of compressed air from being provided to the welding jaws 202 and prevent the welding jaws 202 from closing, causing the welding jaws 202 to remain open while the lid 104 is in and/or being placed in the open position even if or when the clamping operation is activated via, for example, one or more foot valve pedals of the welding device 200.

Figure 3A:
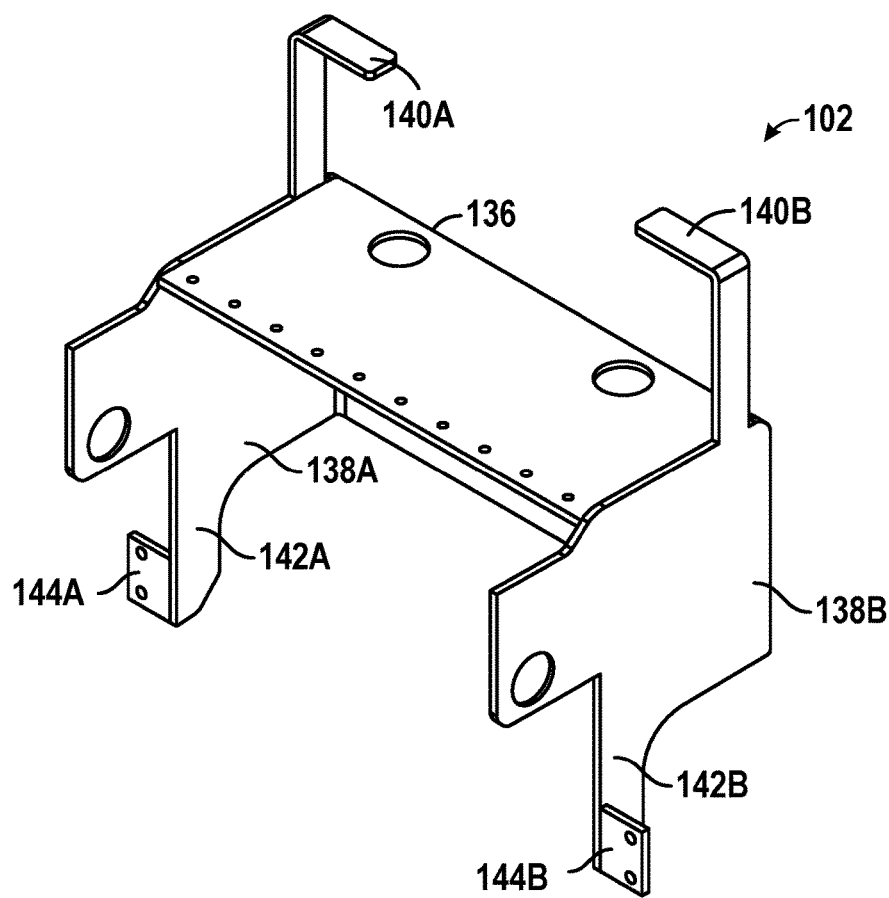
FIGS. 3A-3B illustrate perspective views of a base of the welder guard system, according to illustrative embodiments.
Figure 3B:
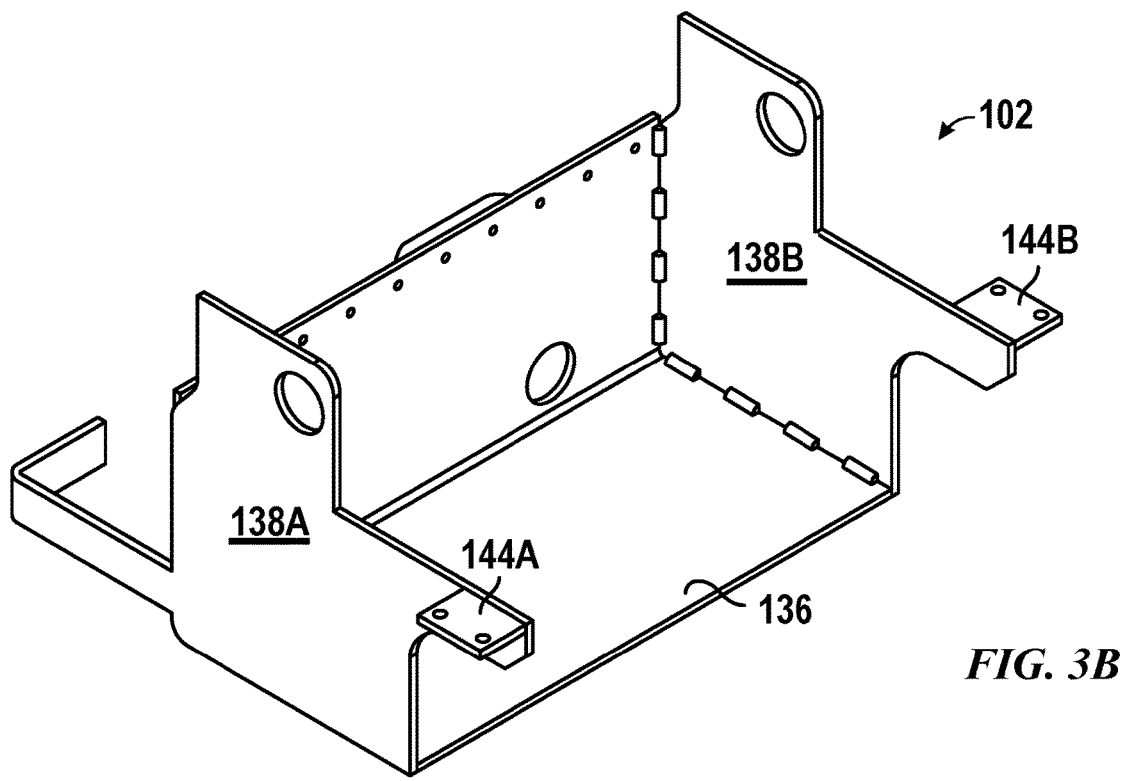

As discussed above, the lid 104 of the welder guard system 100 is rotatably attached to the base 102 of the welder guard system 100. According to embodiments, the welder guard system 100 is mounted to the welding device 200 via the base 102. As illustrated in FIGS. 3A-3B with continued reference to FIGS. 1A-2, the base 102 can include a body 136 and sides 138A-138B. The body 136 of the base 102 can be constructed from a single piece of material bent to form a top portion and a back portion of the body 136. Alternatively, the top portion of the body 136 can be formed from one piece of material and the back portion of the body 136 can be formed from another piece of material that is joined to the top portion by, for example, welding the pieces of the material together and/or attaching the pieces of material together with a fastening device such as screws and/or bolts. The sides 138A-138B of the base 102 can be attached to opposing ends of the body 136 of the base 102 via, for example, welds, screws, bolts, or any other type of fastening device. The body 136 and the sides 138A-138B of the base 102 can be fabricated out of metal, such as steel, or any other type of material that is durable and heat resistant to temperatures experienced during the welding process.

As illustrated in FIG. 3A, the side 138A of the base 102 can include an arm 140A that extends outward from a top edge of the side 138A beyond the top portion of the body 136 of the base 102, and the side 138B of the base 102 can include an arm 140B that extends outward from a top edge of the side 138B beyond the top portion of the body 136 of the base 102. According to embodiments, each of the arms 140A, 140B has an L-shaped configuration with the bottom of the L-shaped configuration of the arm 140A facing inward towards the bottom of the L-shaped configuration of the arm 140B. As illustrated in FIGS. 1B and 2, the arms 140A-140B of the base 102 support and act as a stop for the lid 104 of the welder guard system 100 to rest on when the lid 104 is placed in the open position, according to embodiments. Although the arms 140A, 140B of the base 102 are illustrated and described herein as having an L-shaped configuration and being unattached to one another, it should be appreciated by one skilled in the art that the arms 140A, 140B could take on other configurations and still work as a stop for the lid 104 in the open position. For example, the arms 140A, 140B could extend outward beyond the top portion of the body 136 of the base 102 and connect with one another in a U-shaped configuration.

According to embodiments, the side 138A of the base also includes a support 142A that extends outward from a bottom edge of the side 138A beyond the back portion of the body 136 of the base 102, and the side 138B of the base 102 can include a support 142B that extends outward from a bottom edge of the side 138B beyond the back portion of the body 136 of the base 102. According to embodiments, the supports 142A, 142B include mounts 144A, 144B, respectively, that can be used to attach the welder guard system 100 to the welding device 200. The mounts 144A, 144B can extend along a plane that is substantially perpendicular to that of the supports 142A, 142B. As illustrated in FIG. 3B, the mounts 144A, 144B can include one or more holes for receiving screws, bolts, nails, or any other type of securing mechanism to attach the welder guard system 100 to the welding device 200. When installed on the welding device 200, the base 102 of the welder guard system 100 sufficiently encloses a back portion of the welding jaws 202 of the welding device 200 to prevent an operator from accessing the welding jaws 202 via the back of the welding device 200 and to protect an operator from any hot slag, sparks, and/or flying debris that may be generated during the welding process.

The subject matter described above is provided by way of illustration only and should not be construed as limiting. Various modifications and changes may be made to the subject matter described herein without following the example embodiments and applications illustrated and described, and without departing from the true spirit and scope of the present invention, which is encompassed in the following claims.

What is claimed is:

1. A welder guard system comprising:
   a base;
   a lid attached to the base;
   a control unit for a welding device; and
   a safety switch system comprising an actuating device and a sensing device, wherein the actuating device is attached to the lid, wherein the actuating device comprises a transmitter that transmits a wireless signal, wherein the sensing device comprises a transmitter and a receiver that receives the wireless signal transmitted by the transmitter of the actuating device when the lid is in a closed position and fails to receive the wireless signal transmitted by the transmitter of the actuating device when the lid is in an open position, wherein the transmitter of the sensing device sends a signal to the control unit when the receiver of the sensing device fails to receive the wireless signal transmitted by the transmitter of the actuating device, and wherein the control unit, in response to the signal from the transmitter of the sensing device, prevents a welding jaw of the welding device from closing in response to activation of a clamping operation of the welding device to close the welding jaw.

2. The welder guard system of claim 1, wherein the lid comprises a frame having a top portion and a front portion.

3. The welder guard system of claim 2, wherein the actuating device is attached to a bottom of the front portion of the frame of the lid.

4. The welder guard system of claim 2, wherein the lid further comprises a plurality of pinch point guards, wherein a first pinch point guard of the plurality of pinch point guards is attached on one side of the top portion of the frame of the lid, and wherein a second pinch point guard of the plurality of pinch point guards is attached on an opposing side of the top portion of the frame of the lid.

5. The welder guard system of claim 4, wherein the plurality of pinch point guards move with the lid and relative to the base when the lid is moved from the open position to the closed position and from the closed position to the open position.

6. The welder guard system of claim 2, wherein the top portion of the frame of the lid houses a top panel, and wherein the front portion of the frame of the lid houses a front panel.

7. The welder guard system of claim 1, wherein the receiver of the sensing device fails to receive the wireless signal transmitted by the transmitter of the actuating device when the actuating device is moved, via movement of the lid from the closed position to the open position, outside of a sensing range of the receiver of the sensing device.

8. The welder guard system of claim 1, wherein the control unit comprises a solenoid valve.

9. The welder guard system of claim 8, wherein the solenoid valve of the control unit causes a port associated with a flow of compressed air to the welding jaw of the welding device to close in response to the signal from the transmitter of the sensing device, blocking a supply of the compressed air to the welding jaw and preventing the welding jaw from closing.

10. The welder guard system of claim 1, wherein the base comprises a body, a first side, and a second side, wherein the first side of the base comprises an arm, wherein the second side of the base comprises an arm, and wherein the arm of the first side of the base and the arm of the second side of the base receive the lid only when the lid is placed in the open position.

11. A welder guard system comprising:
    a base;
    a lid attached to the base;
    a control unit for a welding device; and
    a safety switch system comprising an actuating device and a sensing device, wherein the actuating device is attached to the lid, wherein the actuating device comprises a piece of conductive metal, wherein the sensing device comprises a transmitter and an inductive proximity sensor that produces an electromagnetic field, wherein the inductive proximity sensor detects the actuating device when the lid is in a closed position causing the actuating device to be within the electromagnetic field of the inductive proximity sensor and fails to detect the actuating device when the lid is in an open position causing the actuating device to be outside of the electromagnetic field of the inductive proximity sensor, wherein the transmitter of the sensing device sends a signal to the control unit when the inductive proximity sensor fails to detect the actuating device, and wherein the control unit, in response to the signal from the transmitter of the sensing device, prevents a welding jaw of the welding device from closing in response to activation of a clamping operation of the welding device to close the welding jaw.

12. The welder guard system of claim 11, wherein the lid comprises a frame having a top portion and a front portion.

13. The welder guard system of claim 12, wherein the actuating device is attached to a bottom of the front portion of the frame of the lid.

14. The welder guard system of claim 12, wherein the lid further comprises a plurality of pinch point guards, wherein a first pinch point guard of the plurality of pinch point guards is attached on one side of the top portion of the frame of the lid, and wherein a second pinch point guard of the plurality of pinch point guards is attached on an opposing side of the top portion of the frame of the lid.

15. The welder guard system of claim 14, wherein the plurality of pinch point guards move with the lid and relative to the base when the lid is moved from the open position to the closed position and from the closed position to the open position.

16. The welder guard system of claim 11, wherein the control unit comprises a solenoid valve.

17. The welder guard system of claim 16, wherein the solenoid valve of the control unit causes a port associated with a flow of compressed air to the welding jaw of the welding device to close in response to the signal from the transmitter of the sensing device, blocking a supply of the compressed air to the welding jaw and preventing the welding jaw from closing.

18. The welder guard system of claim 11, wherein the base comprises a body, a first side, and a second side, wherein the first side of the base comprises an arm, wherein the second side of the base comprises an arm, and wherein the arm of the first side of the base and the arm of the second side of the base receive the lid only when the lid is placed in the open position.

* * * * *